(12) United States Patent
Roberts et al.

(10) Patent No.: US 7,631,733 B2
(45) Date of Patent: Dec. 15, 2009

(54) BRAKE ASSEMBLY

(75) Inventors: Paul Roberts, Newport (GB); Royston Leonard Morris, Newport (GB); Nagaraja Gargeshwari, Karnataka (IN); Pradeep Mirji, Karnataka (IN); Kishan Kumar Udupi, Karnataka (IN); Rajaram Kumble, Karnataka (IN)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 166 days.

(21) Appl. No.: 11/159,831

(22) Filed: Jun. 23, 2005

(65) Prior Publication Data

US 2005/0284710 A1 Dec. 29, 2005

(30) Foreign Application Priority Data

Jun. 24, 2004 (GB) ................. 0414108.1

(51) Int. Cl.
*F16D 65/00* (2006.01)
(52) U.S. Cl. .............. 188/73.1; 188/73.32; 188/73.39
(58) Field of Classification Search ............. 188/73.32, 188/73.39, 73.35, 73.36, 73.37, 73.1, 250 B, 188/250 F
See application file for complete search history.

(56) References Cited

U.S. PATENT DOCUMENTS

| | | | | |
|---|---|---|---|---|
| 3,042,152 | A | * | 7/1962 | Butler ...................... 188/73.32 |
| 3,390,744 | A | * | 7/1968 | Fawick ....................... 188/72.2 |
| 4,099,600 | A | * | 7/1978 | Temperley et al. ........ 188/73.39 |
| 4,121,699 | A | * | 10/1978 | Tsuruta et al. ............ 188/73.43 |
| 4,130,186 | A | * | 12/1978 | de Gennes ................... 188/76 |
| 4,200,173 | A | | 4/1980 | Evans et al. |
| 4,508,199 | A | * | 4/1985 | Herbulot et al. ......... 188/250 B |

(Continued)

FOREIGN PATENT DOCUMENTS

EP 0 752 541 1/1997

(Continued)

OTHER PUBLICATIONS

United Kingdom Search Report dated Oct. 8, 2004.

(Continued)

*Primary Examiner*—Robert A Siconolfi
*Assistant Examiner*—Vu Q Nguyen
(74) *Attorney, Agent, or Firm*—Carlson, Gaskey & Olds

(57) ABSTRACT

A brake assembly includes a caliper having a first side portion connected to a second side portion by two circumferentially spaced bridge arms. The brake assembly includes a first brake pad and a second brake pad that are interchangeable and each having first and second circumferential ends. Each of the first and second brake pads have a pad formation remote from the first and second circumferential ends. The first brake pad is fitted in the first side portion of the caliper with the pad formation of the first brake pad engaging a caliper formation of the first portion side of the caliper for transferring braking torque loads from the first brake pad to the first side portion of the caliper. The second brake pad is fitted in the second side portion of the caliper with the first and second circumferential ends of the second brake pad engaging respective first and second circumferentially spaced abutments of the brake assembly for transferring braking torque loads from the second brake pad to the brake assembly.

17 Claims, 16 Drawing Sheets

U.S. PATENT DOCUMENTS

| | | | |
|---|---|---|---|
| 4,606,438 A | | 8/1986 | Mathias |
| 4,823,920 A | * | 4/1989 | Evans .................... 188/73.34 |
| 4,995,482 A | * | 2/1991 | Kobayashi et al. ......... 188/73.1 |
| 5,129,487 A | * | 7/1992 | Kobayashi et al. ......... 188/73.1 |
| 5,343,985 A | | 9/1994 | Thiel et al. |
| 5,464,077 A | * | 11/1995 | Thiel et al. ................. 188/72.5 |
| 6,135,244 A | * | 10/2000 | Le Bris .................... 188/73.37 |
| 6,357,559 B1 | | 3/2002 | Madzgalla et al. |
| 2003/0183460 A1 | | 10/2003 | Lumpkin et al. |

FOREIGN PATENT DOCUMENTS

| | | |
|---|---|---|
| EP | 0 906 856 | 4/1999 |
| EP | 1 085 229 | 3/2001 |
| FR | 2 538 483 | 6/1984 |
| GB | 880 870 | 10/1961 |
| GB | 1 538 864 | 1/1979 |
| JP | 09303432 | 11/1997 |

OTHER PUBLICATIONS

European Search Report dated Sep. 19, 2005.

* cited by examiner

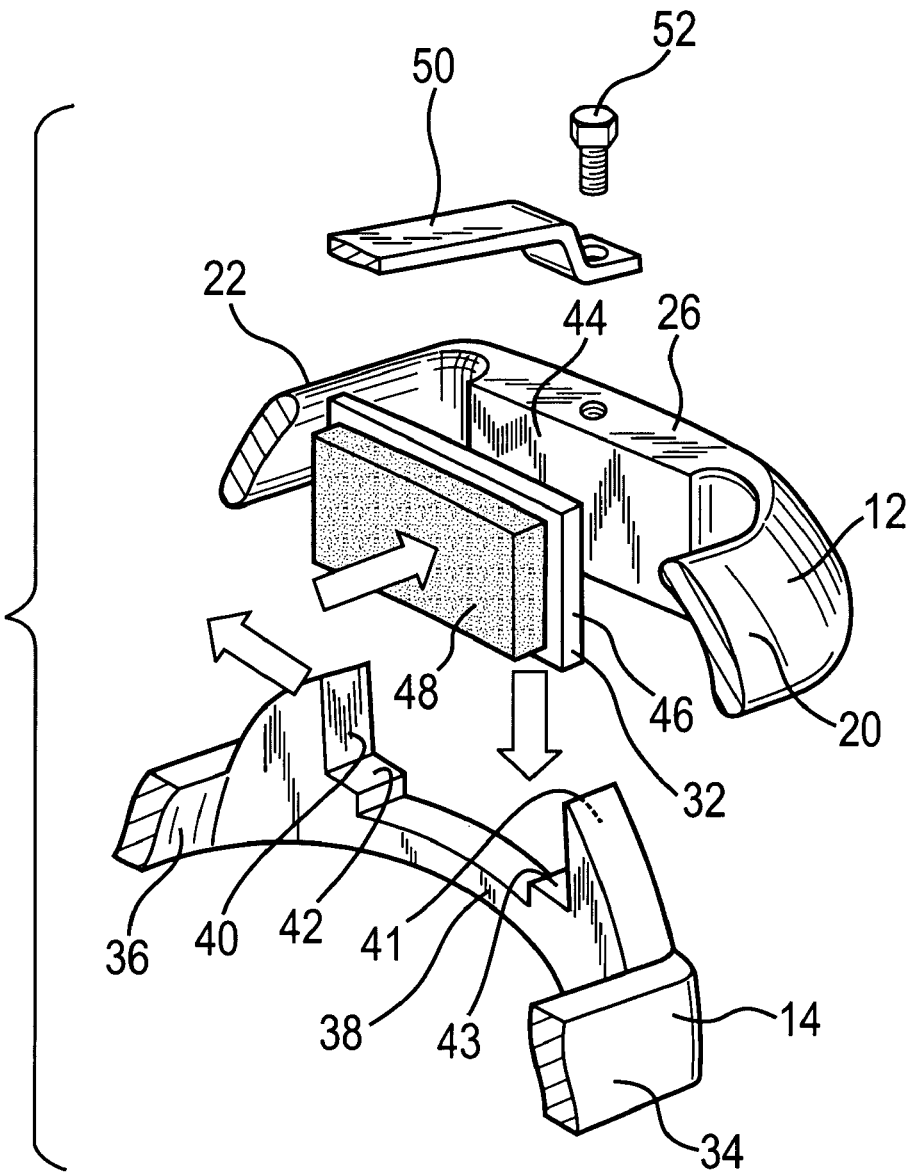

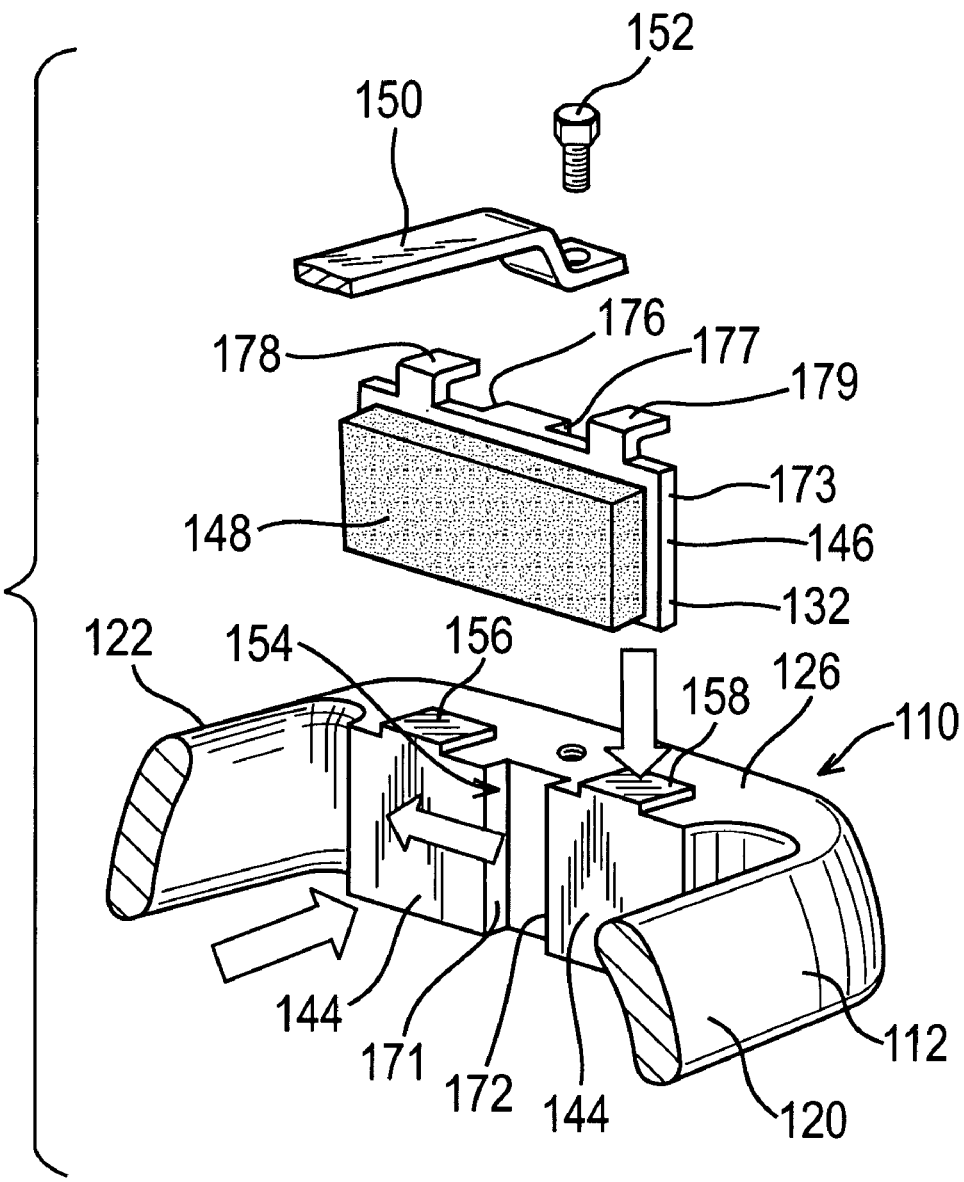

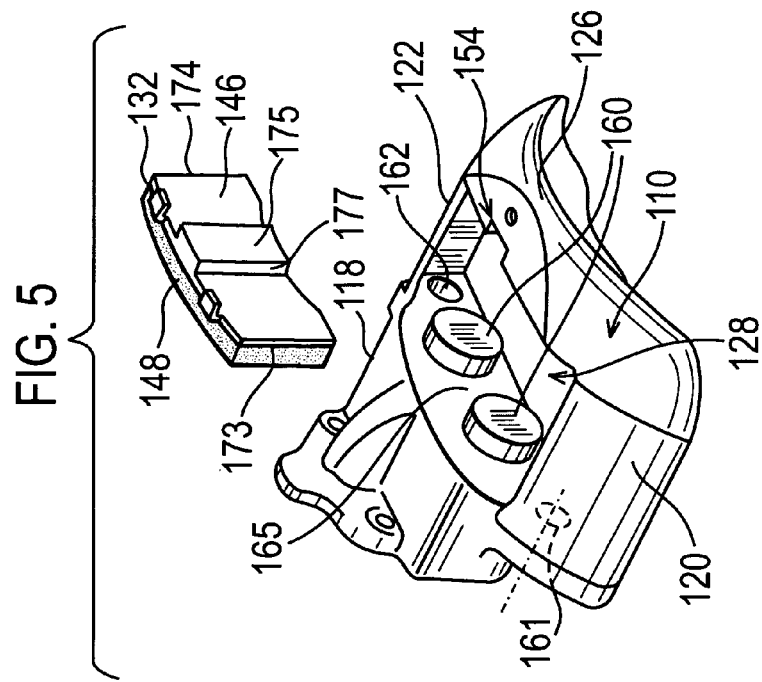
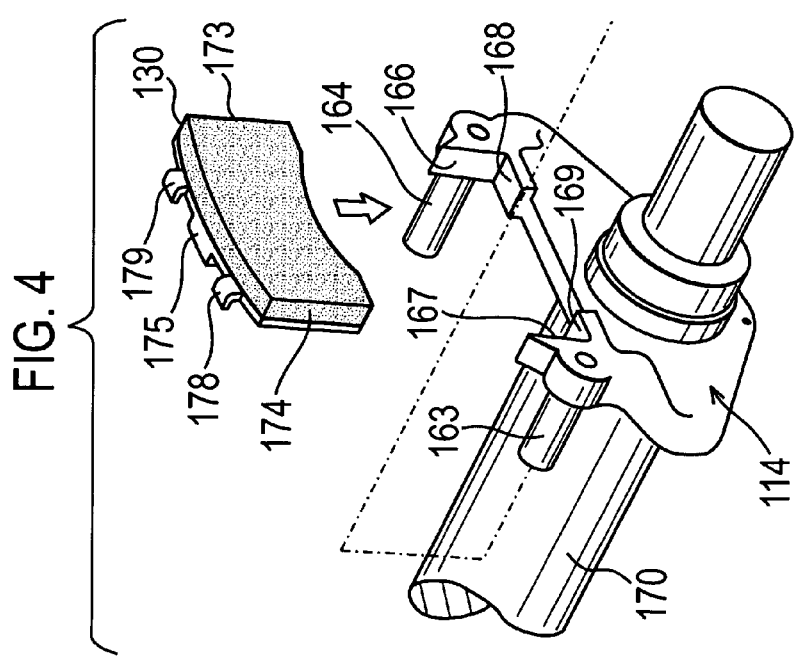

BRAKE ASSEMBLY

REFERENCE TO RELATED APPLICATIONS

This application claims priority to Great Britain Patent Application 0414108.1 filed on Jun. 24, 2004.

BACKGROUND OF THE INVENTION

The present invention relates generally to a brake assembly, and in particular to a sliding caliper brake assembly or a brake assembly having a sliding disc for use on heavy road vehicles such as trucks, lorries, buses, etc.

Brake calipers for motorcycles and cars are relatively light and are therefore easily handled by a single person. Accordingly, when replacing worn brake pads, it is acceptable to provide a design such that the brake caliper is removed, the worn brake pads are then replaced with new brake pads, and then the brake caliper is replaced. Such an arrangement is shown in U.S. Pat. No. 4,200,173.

Sliding caliper brakes for heavy road vehicles are necessarily themselves heavy. Typically, the sliding caliper alone (in the absence of an associated carrier) will be so heavy that it is unsafe to be lifted by a single person alone (for example, during servicing) when the worn brake pads are replaced with new brake pads. For this reason, known heavy vehicle sliding caliper brake assemblies include two circumferentially spaced bridge arms each connecting the actuator side of the caliper to the reaction side, thereby defining a window through which a worn brake pad can be removed and through which new brake pads can be inserted. Such an arrangement does not require the removing of the sliding caliper. EP0906856 shows just such an arrangement.

It is advantageous for manufacturers to minimize the number of different parts for brake assemblies in order to save on tooling costs and in order to gain the benefit of high volume production. Furthermore, by designing a caliper with a fewer number of different parts, this provides benefits in terms of stocking spares. It is particularly advantageous to minimize the number of different parts for service items, i.e., items that will normally require replacement at appropriate service intervals throughout the life of the associated vehicle. Accordingly, brake manufacturers will often design brake assembles wherein the two brake pads for the brake assembly are identical. When considering a vehicle axle, the caliper on the right hand end of the axle is often a mirror image of the caliper on the left hand end of the axle, meaning that it is possible for all four brake pads on that axle to be identical. U.S. Pat. No. 4,200,173, EP0906856 and EP0752541 are examples of brake calipers including a pair of brake pads which are identical. Accordingly, the brake pads are interchangeable. Thus, a particular brake pad can be fitted on either the inboard side or the outboard side of the brake disc with the other brake pad being fitted on the other of the inboard side or outboard side of the brake disc.

By contrast, U.S. Pat. No. 5,343,985 shows an example where the outboard single brake pad is not interchangeable with the pair of smaller inboard brake pads.

The brake pads of brake calipers can either be actuated from both sides of the caliper or they can be actuated from a single side. An example of the former would be where a brake caliper includes one or more hydraulically operated pistons on an inboard side and the same number of hydraulically operated pistons on an outboard side. Under such circumstances, the caliper is axially fixed to a suspension component, and the brake disc is also axially fixed to another suspension component. Actuation of the brake will cause hydraulic fluid to move the inboard piston or pistons outwardly, thereby pushing the inboard brake pad onto the brake disc and causing the outboard piston or pistons to move inwardly, thereby pushing the outboard brake pad onto the brake disc.

In contrast, U.S. Pat. No. 4,200,173, EP0906856, EP0752541 and U.S. Pat. No. 5,343,985 show examples of brake calipers that are actuated from a single side. In all cases, the actuator will be mounted on the inboard side of the brake disc. Since none of these examples have an actuator on the outboard side of the brake disc, the outboard side of the caliper is relatively compact and therefore occupies a relatively small space envelope within the wheel than would be the case for an equivalent caliper having an actuator on an outboard side.

U.S. Pat. No. 4,200,173, EP0906856, EP0752541 and U.S. Pat. No. 5,343,985 are all examples of sliding caliper brakes. Thus, the calipers will be allowed to slide, typically on pins, in an axial direction (when considering the axis of rotation of the associated brake disc). This allows for the brake caliper to move slightly inboard when the brake is applied to allow the running clearance between the brake disc and the outboard brake pad to be closed so as to frictionally engage the outboard brake pad with the brake disc. Furthermore, as the outboard brake pad wears, the normal running position of the caliper (i.e., the position of the caliper when the brakes are not applied) will progressively move axially inwardly to maintain the running clearance between the outboard brake pad and the disc.

It is also possible to have a caliper actuated from a single side in which the caliper is axially fixed to a suspension component, as opposed to the "sliding caliper" design refer to above. However, a caliper that is actuated from a single side and is axially fixed requires a sliding brake disc. In order to take up the running clearance between the outboard brake pad and the disc, the disc must be moved towards the outboard brake pad since the outboard brake pad is axially fixed in the caliper and the caliper, as mentioned above, is also axially fixed. Sliding disc brakes having actuators actuated from a single side are known.

The brake pads of known brake calipers include a steel brake pad backplate onto which is bonded or otherwise affixed friction material. The friction material is typically arcuate in shape in order to correspond with the brake disc against which it engages during braking (see, for example, U.S. Pat. No. 4,200,173, EP0906856, EP0752541 and U.S. Pat. No. 5,343,985). The brake pad backplate is therefore also generally arcuate in shape and has circumferential ends. When the brakes are applied, the braking torque loads (also known as tangential loads) must be transferred from the brake pad to the vehicle via the suspension. U.S. Pat. No. 4,200,173 and EP0752541 show examples of the braking torque loads of both the inboard and outboard brake pads being transferred to a brake carrier that is rigidly fixed to the vehicle axle or other equivalent suspension component. Significantly, the braking torque loads are not transferred through the sliding caliper and hence the pins on which the sliding caliper slides do not take any braking torque loads. However, both U.S. Pat. No. 4,200,173 and EP0752541 require an axially fixed structure on the outboard side of the brake disc in order to transfer the brake torque loads and axially slideable structure on the outboard side of the brake disc in order for the caliper to apply a clamp load to the brake pads when the brakes are applied. Thus, an appropriate space envelope must be provided for the axially fixed structure and the axially slideable structure on the outboard side of the brake disc where traditionally space is limited because of the proximity of the associated wheel rim.

EP0906856 shows an example of the braking torque loads from the outboard brake pad being transferred to the sliding caliper, but these braking torque loads are then transferred on to lugs of the fixed carrier which are positioned on the axially outboard side of the brake disc.

In U.S. Pat. No. 4,200,173, EP0906856 and EP0752541, because the brake torque loads are transferred via the circumferential ends of the pad brake backplate, an appropriate abutment must be provided on the carrier or the caliper in this region. This limits the design freedom of the caliper and the carrier.

A known problem with certain designs of brake calipers is that it is possible to fit the brake pads the wrong way, i.e., fit the brake pads such that the steel brake pad backplate faces the brake disc. Wrongly fitted brake pads are clearly unsafe. EP0752541 provides one way of ensuring the brake pads must be fitted the right way.

SUMMARY OF THE INVENTION

An object of the present invention is to provide a brake assembly which mitigates one or more of the above problems.

Thus, the present invention provides a brake assembly including a caliper having a first side portion connected to a second side portion by two circumferentially spaced bridge arms. The brake assembly includes a first brake pad and a second brake pad that are interchangeable and each having first and second circumferential ends. Each of the first and second brake pads have a pad formation remote from the first and second circumferential ends. The first brake pad is fitted in the first side portion of the caliper, with the pad formation of the first brake pad engaging a caliper formation of the first side portion of the caliper to transfer braking torque loads from the first brake pad to the first side portion of the caliper. The second brake pad is fitted in the second side portion of the caliper with the first and second circumferential ends of the second brake pad engaging respective first and second circumferentially spaced abutments of the brake assembly to transfer braking torque loads from the second brake pad to the brake assembly.

BRIEF DESCRIPTION OF THE DRAWINGS

The invention will now be described, by way of example only, with reference to the accompanying drawings in which:

FIG. 2 is a partial exploded view of FIG. 1;

FIGS. 3 to 6 show various views of a brake assembly according to the present invention;

DETAILED DESCRIPTION OF THE PREFERRED EMBODIMENT

Figure 1:
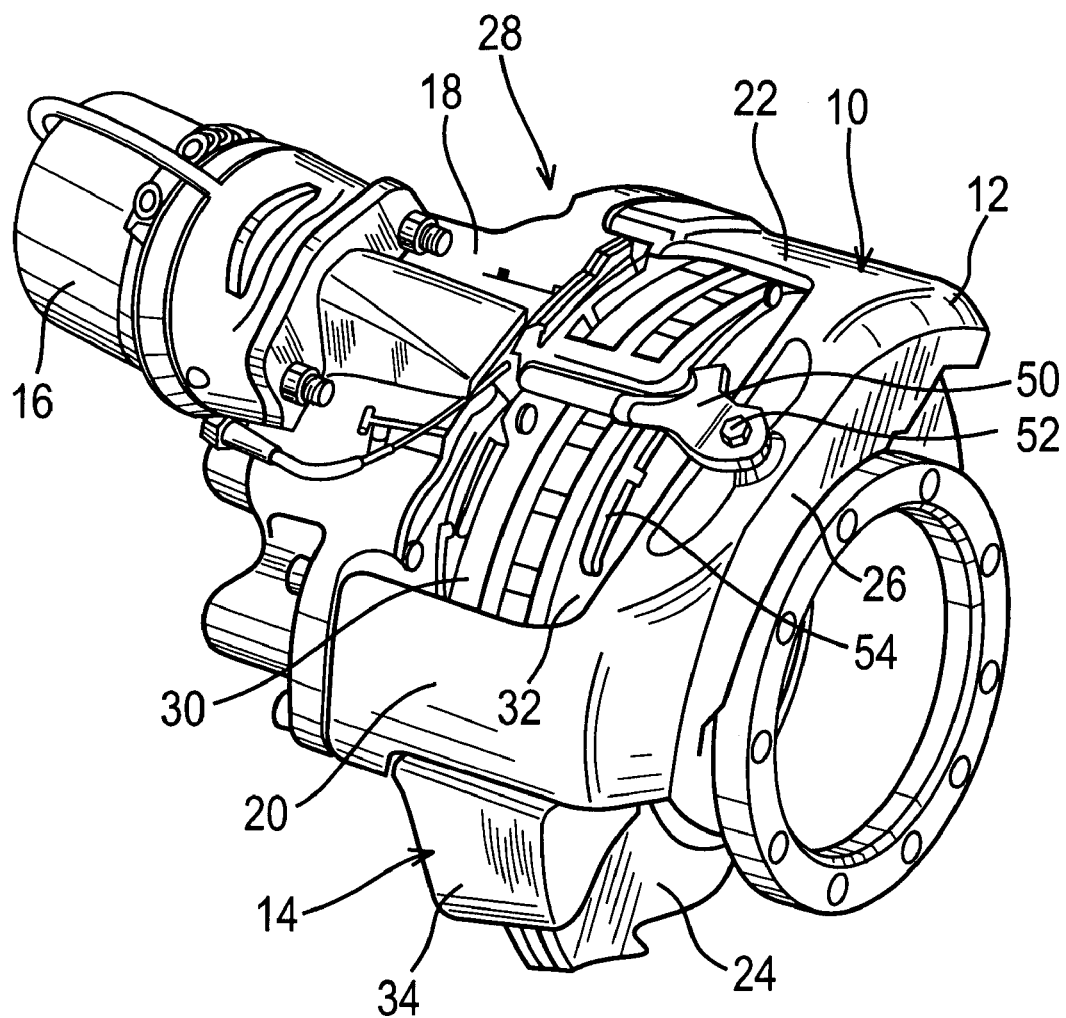
FIG. 1 is an isometric view of a known brake assembly.

With reference to FIGS. 1 and 2, there is shown a known brake assembly 10 having a sliding caliper 12 and a carrier 14. The sliding caliper 12 includes an air chamber 16 fixed to an actuator housing 18 within which sits an actuator assembly (not shown).

The sliding caliper 12 further includes circumferentially spaced bridge arms 20 and 22 which are positioned radially outwardly of a brake disc 24. The sliding caliper 12 further has a reaction side portion 26 which connects ends of the bridge arms 20 and 22. The sliding caliper 12 is slideably mounted on pins (not shown) of the carrier 14.

In use, the carrier 14 will typically be secured to an axle of a heavy vehicle. A wheel hub is mounted on the end of the axle and rotationally secured to a wheel and a brake disc 24. The brake assembly 10 is arranged such that a reaction side portion 26 is at an outboard end of the axle, and the air chamber is positioned inboard of the reaction side portion 26. Thus, the actuator housing 18 is positioned on an inboard side of the brake disc 24, and the reaction side portion 26 is positioned at an outboard side of the brake disc 24. The actuator housing 18, the bridge arms 20 and 22 and the reaction side portion 26 together define a window 28 which allows an actuator side brake pad 30 (also known as an inboard brake pad) and a reaction side brake pad 32 (also known as an outboard brake pad) to be inserted or removed, for example, during replacement of worn pads with new pads.

Turning to FIG. 2, there is shown in more detail parts of the carrier 14 which include circumferentially spaced carrier arms 34 and 36, and the outboard most ends of which are connected by a carrier reaction side portion 38.

The carrier reaction side portion 38 includes circumerferentially spaced torque reaction abutments 40 and 41 and generally radially outwardly facing radial load abutments 42 and 43. Similar torque reaction abutments and radial load abutments can be found on an actuator side (or inboard side) of the carrier 14. The caliper reaction side portion 26 includes a clamp load abutment 44. The reaction side brake pad 32 includes a backplate 46 secured to friction material 48. The actuator side brake pad 30 is identical to the reaction side brake pad 32.

Operation of such a sliding caliper brake is well known to those skilled in the art, but in summary, air is admitted into the air chamber 16, which operates on a diaphragm to cause a push rod to operate the actuator assembly contained within actuator housing 18. The actuator assembly includes two pistons which act on the backplate of the actuator side brake pad 30 to force the friction material of the actuator side brake pad 30 into engagement with the actuator side of the brake disc 24. This lateral clamp load force causes an equal and opposite reaction force which results in the sliding caliper 12 sliding inboard on its pins until the clamp load abutment 44 of the caliper reaction side portion 26 acts on the backplate 46 to force the friction material 48 into engagement with the reaction side surface of the brake disc 24. The brake disc 24 is then clamped between the brake pads 30 and 32, and the frictional torque applied to the outboard pad is transferred directly to either of the torque reaction abutments 40 or 41 of the carrier 14, depending upon the direction of rotation of the brake disc 24. Similarly, the frictional torque applied to the actuator side brake pad 30 is transferred to the equivalent torque reaction abutment 40 and 41 of the carrier 14 on the inboard side of the brake disc 24.

Ideally, the brake assembly 10 will be mounted such that the window 28 faces generally upwardly relative to the associated vehicle. Thus, the radial load abutments 42 and 43 provide a vertical reaction load to support the weight of the outboard pad. A pad retainer 50 is secured to the caliper 12, and a pad spring 54 acts on a top of the reaction side brake pad 32 and reacts on a bottom surface of a brake pad retainer to prevent the reaction side brake pad 32 from rattling and escaping from the window 28 in use. Thus, the radial load abutments 42 and 43 also provide a spring reaction load to react against the pad spring 54.

However, due to particular installations, it is not always possible to mount the brake assembly such that the window 28 faces upwardly. In order to avoid vehicle suspension components, it may be necessary to mount the brake assembly 10 up to 135 degrees either side of a vertical position. Thus, depending upon the particular installation, the radial load abutments 42 and 43 may not have to react the full weight (or indeed any of the weight) of the outboard pad. Nevertheless, since the spring load is significantly higher than the weight of the outboard pad, the radial load abutments 42 and 43 will nevertheless have to provide a reaction force. By way of example, a brake pad might weigh 30 newtons, and the installed pad spring load might be 300 newtons. In summary, the clamp loads are provided by the caliper 12, and the torque loads and radial (or vertical) loads are reacted by the carrier 14.

Figure 21:
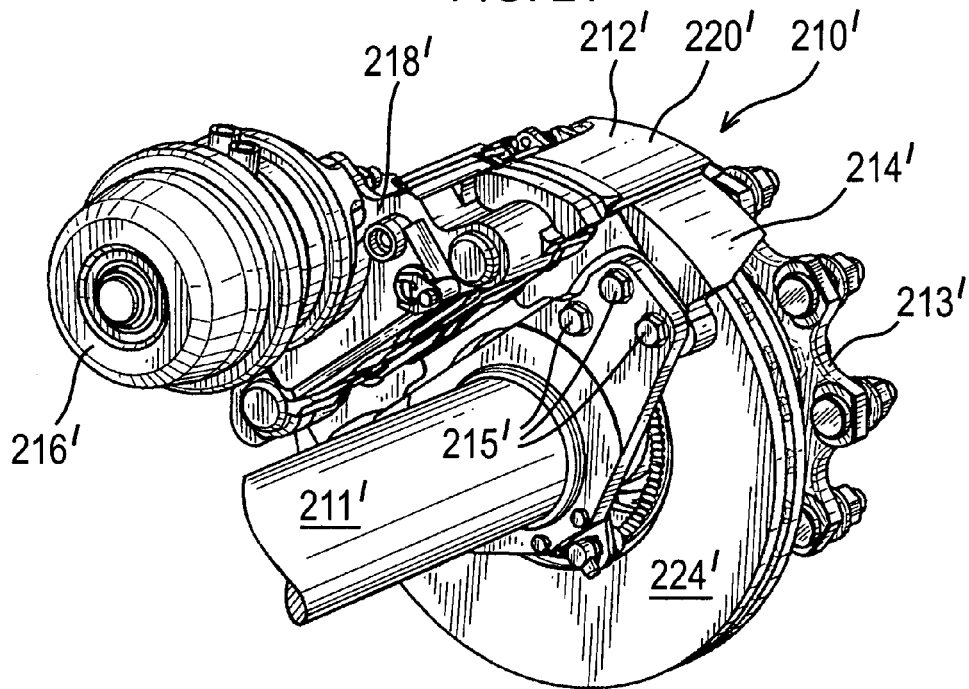
FIG. 21 shows a further example of a known brake assembly.
Figure 22:
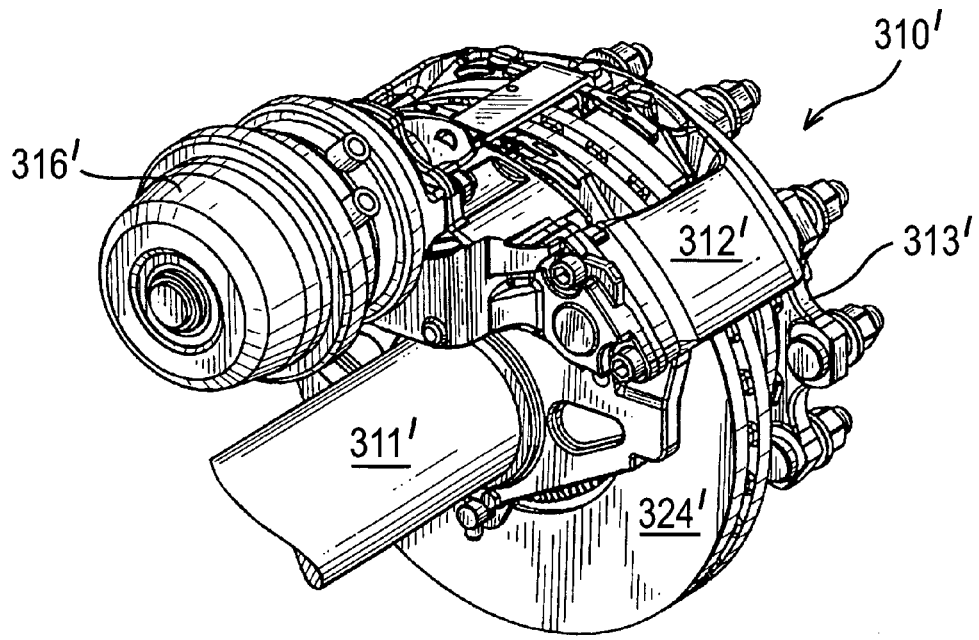
FIGS. 22 to 25 show various views of a further brake assembly according to the present invention.
Figure 23:
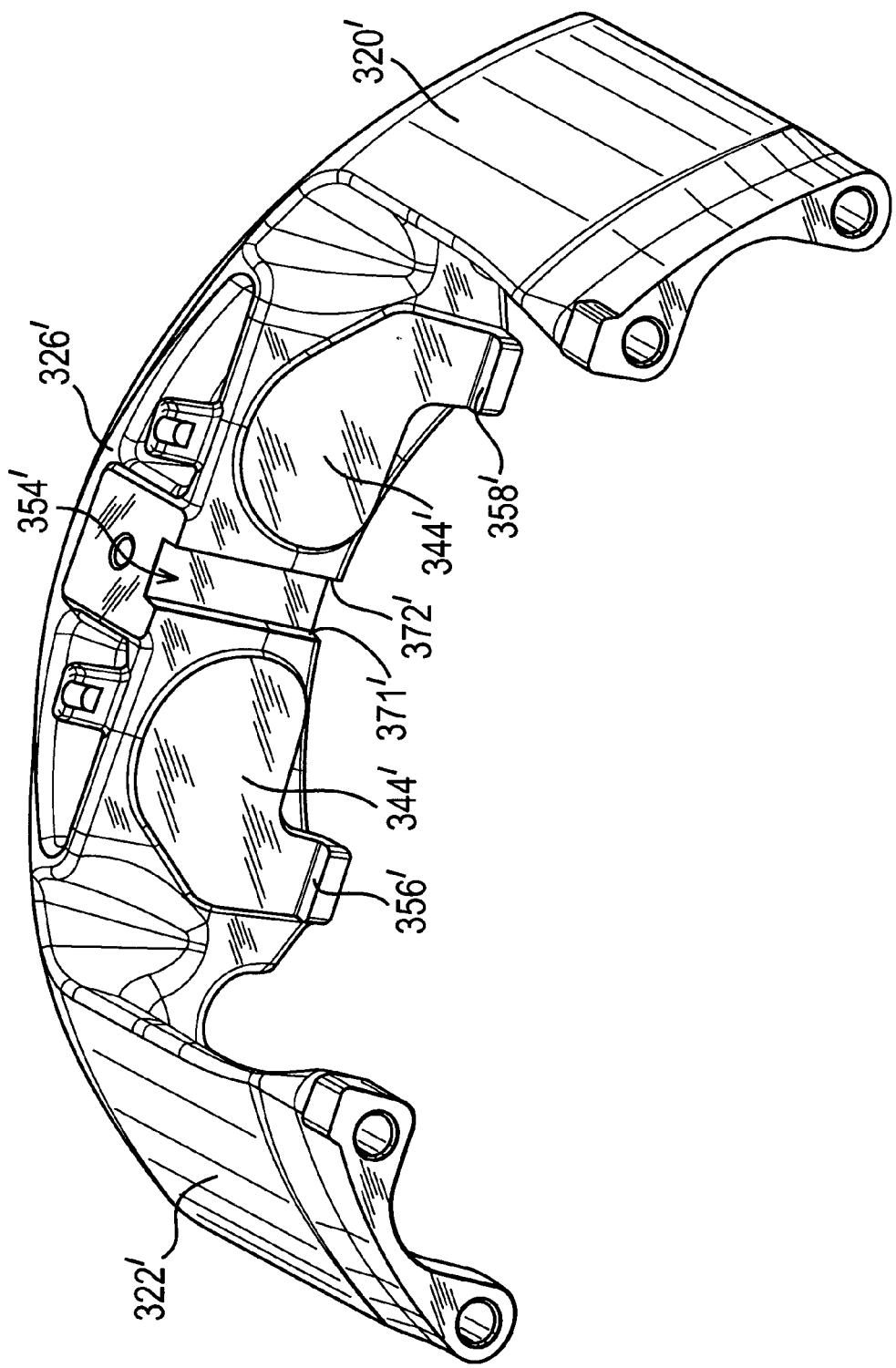
Figure 24:
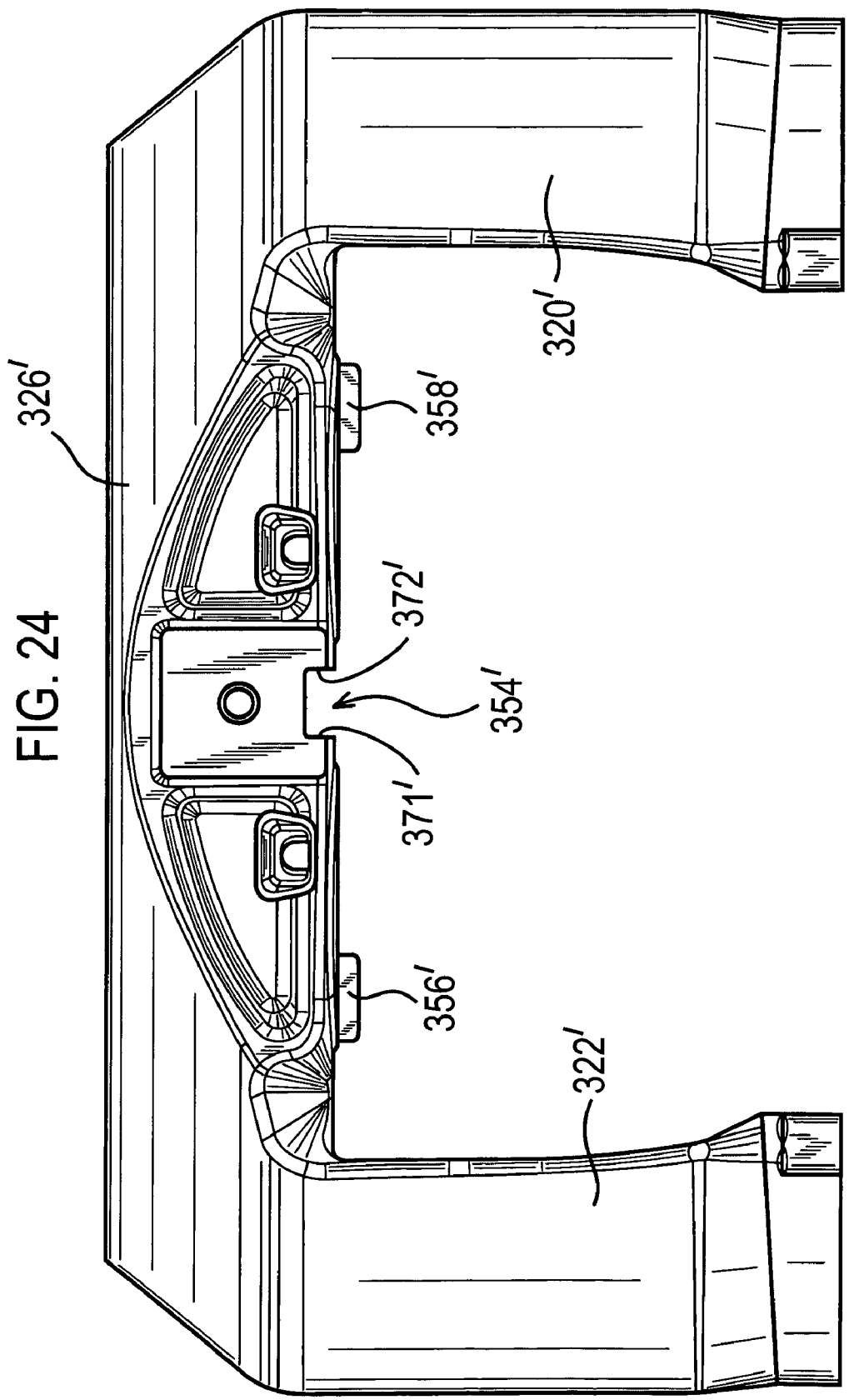
Figure 25:
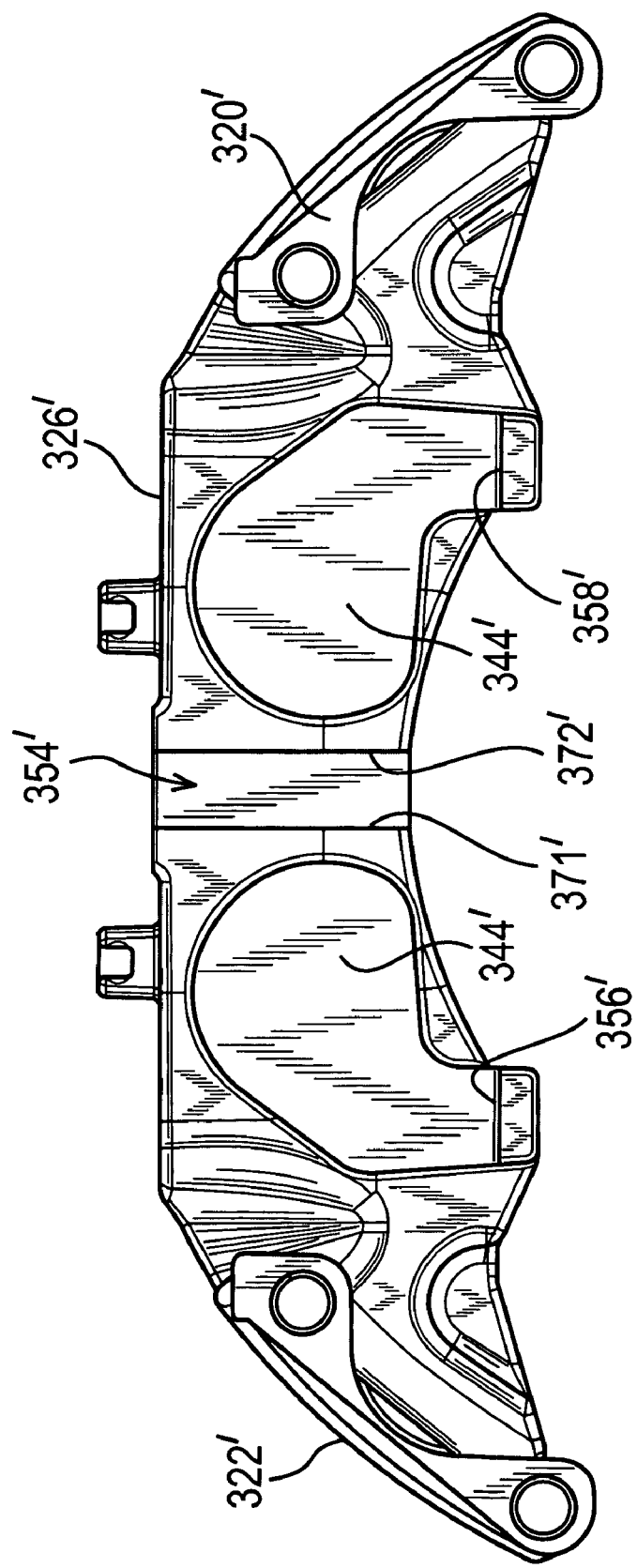
Figure 26:
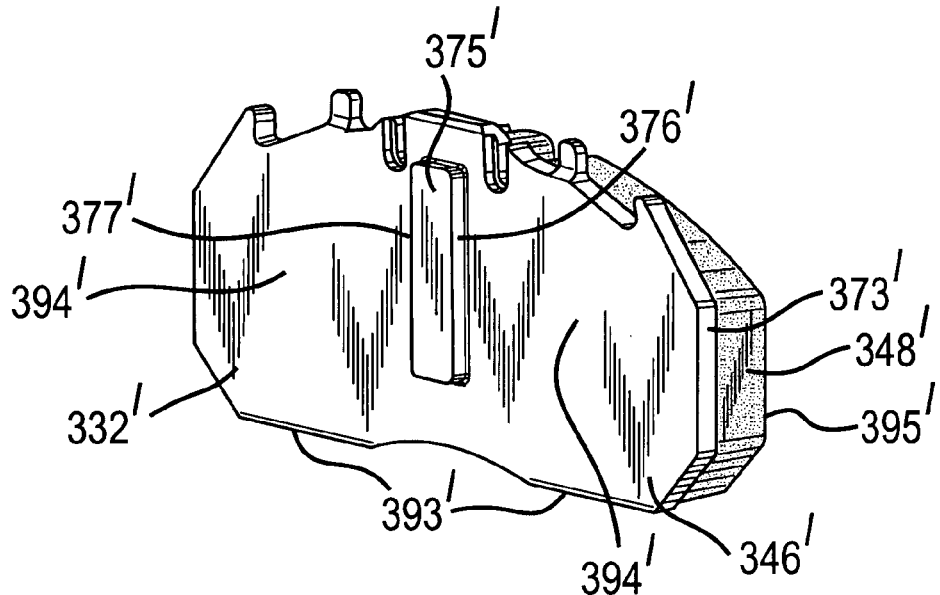
FIG. 26 shows an isometric view of a brake pad for use in a brake caliper of FIG. 22.

FIG. 21 shows a further example of a known brake assembly 210', in which components are labelled 200' greater than their equivalent in the brake assembly 10. FIG. 21 shows a vehicle axle 211' and the way in which a carrier 214' is fixed thereto by bolts 215'. FIG. 21 also shows the rotating hub 213' to which a vehicle wheel is fitted.

As mentioned above, the present invention relates to brake assemblies, particularly for use on heavy road vehicles such as trucks, lorries, buses, etc. Such brake assemblies are necessarily large and heavy when compared with brake assemblies for lighter vehicles, such as cars and motorcycles. In fact, typically the sliding caliper alone (in the absence of the carrier) will be so heavy that it is unsafe to be lifted by a single person alone. It is for this reason that the brake assembly has been designed so that when the brake pads are worn and require replacement, they can be removed without having to remove the sliding caliper. In particular, the window 28 facilitates removal of the brake pads (once the pad retainer 50 has been removed) without having to demount the sliding caliper 12.

FIGS. 3 to 6 show a first embodiment 110 of a brake assembly according to the present invention in which components similar to those components of the brake assembly 10 are labelled 100 greater. Significantly, the only difference between the sliding caliper 12 and the sliding caliper 112 is that the latter includes a radially orientated groove 154 and radial load abutment pads 156 and 158.

FIG. 5 shows in more detail certain components of the sliding caliper 112. Thus, two circumferentially spaced actuator pistons 160 (also known as tappet assemblies) can be seen projecting in an outboard direction from the actuator housing 118. The circumferential spacing of the pistons 160 define therebetween a recess 165. Furthermore, FIG. 5 shows holes 161 and 162 which allow the caliper 112 to slide on pins 163 and 164, respectively, of the carrier 114.

The carrier 114 includes inboard (or actuator side) torque reaction abutments 166 and 167 and inboard (actuator side) radial load abutments 168 and 169. The torque reaction abutments 166 and 167 are engaged by corresponding circumferential ends 173 and 174 of the brake pad. The carrier 114 is secured rotationally fast to an axle 170. Significantly, the carrier 114 does not include the carrier arms 34 and 36 of the carrier 14. Furthermore, the carrier 114 does not include the carrier reaction side portion 38 and the associated abutments of the carrier 14.

In summary, in respect of the outboard brake pad, the function of the torque reaction abutments 40 and 41 of the carrier 14 are provided by the radially orientated groove 154 of the caliper 112, and the function of the radial load abutments 42 and 43 of the carrier 14 are provided by the radial load abutments 156 and 158 of the caliper 112. Significantly, in respect of the inboard brake pad, the brake torque loads are still transferred to the carrier 114 by the circumferential ends of the brake pad.

In more detail, the radially orientated groove 154 includes a torque reaction abutment 171 on one circumferential side thereof and a further torque reaction abutment 172 on the other circumferential side thereof.

Figure 6:
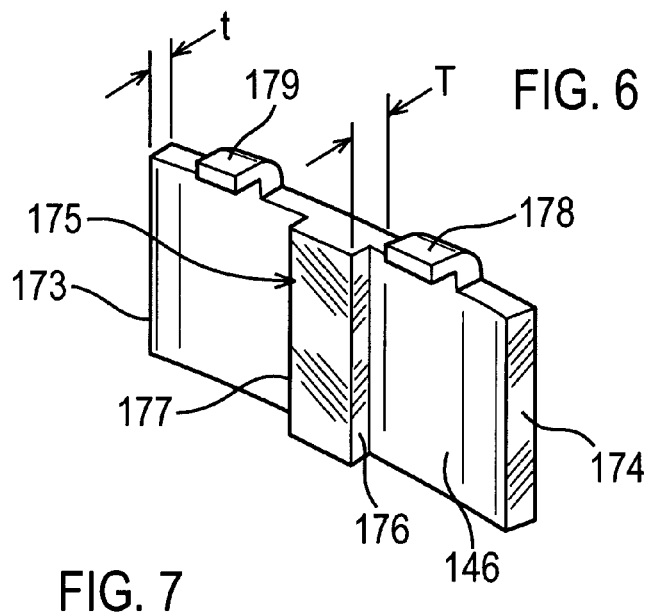

FIG. 6 shows the brake pad backplate 146 of the outboard brake pad 132. The backplate has circumferential ends 173 and 174 and is generally arcuate. A first formation in the form of a radially orientated rib 175 is provided remote from circumferential ends 173 and 174. The rib 175 includes circumferentially spaced edges 176 and 177 which, when assembled into the caliper 112, face the torque reaction abutments 171 and 172, respectively.

A backplate 146 further includes circumferentially spaced tabs 178 and 179 bent from a radially outer edge of the backplate 146, the radially inwardly facing surfaces of which abut radially outwardly facing load abutment pads 156 and 158 (positioned at a radially outer edge of the reaction side portion), respectively, when assembled into the caliper 112.

A clamp load is provided by clamp load abutments 144, just as the clamp load on the brake assembly 10 is provided by the clamp load abutments 144. However, in the brake assembly 110, the frictional torque is transferred from the backplate 146 via edges 176 or 177 of the rib 175 to the torque reaction abutment 171 or 172 of the groove 154 of the sliding caliper 112. The torque reaction loads of the outboard pad are then transferred to the carrier 114 via pins 163 and 164, which are positioned on the actuator side of the brake disc.

Also, the radial (or vertical) loads of the brake pad are transferred via the tabs 178 and 179 to the radial load abutment pads 156 and 158 of the caliper 112. These radial loads are then transferred to the carrier 114 via the pins 163 and 164.

In particular, the circumferential ends 173 and 174 of the outboard backplate 146 play no part in transferring the torque loads to the caliper 112. Such an arrangement provides for greater design freedom in the design of the caliper 112 in the region of the circumferential ends 173 and 174 because no torque reaction abutments need to be provided on the caliper 112 in this region.

Consideration of FIG. 2 shows that when the vehicle is travelling in a forwards direction and the brake is applied, the outboard brake pad torque load will be transferred to the torque reaction abutment 40. Because this is relatively close to the carrier arm 36 and relatively remote from the carrier arm 34, the carrier arm 36 will transfer most of the brake torque from the outboard brake pad to the axle. Conversely, when the vehicle is travelling in reverse and the brakes are applied, the carrier arm 34 will transfer the bulk of the brake torque to the axle. FIG. 5 shows that the radially orientated groove 154 is equally spaced from bridge arms 120 and 122.

Because of this, the bridge arms 120 and 122 share equally in transferring the outboard brake pad torque loads to the axle.

Turning to FIGS. 4 and 5, the inboard brake pad 130 is identical to the outboard brake pad 132. However, in this case, the torque loads from the inboard brake pad 130 are transferred directly to the carrier 114 via the circumferential ends 173 and 174 abutting the torque reaction abutments 166 and 167 as appropriate, depending upon direction of rotation of the brake disc. Thus, the radially orientated rib 175 of the inboard brake pad 130 is redundant. Conveniently, the rib 175 sits within the recess 165 and is not engaged by, and does not interfere with, the operation of the pistons 160.

The radial (vertical) loads from the inboard brake pad 130 are transferred via radially inner edges of the backplate directly to the radial load abutments 168 and 169 of the carrier 114. Thus, the tabs 178 and 179 of the inboard brake pad 130 are redundant and sit conveniently outboard of the pistons 160 and therefore do not contact or otherwise interfere with the operation of the pistons 160.

The pins 163 and 164 only take the torque reaction loads from one pad (the outboard pad), since the torque loads from the other pad (the inboard pad) are transferred directly to the carrier 114 and do not pass via the caliper 112.

The radially orientated rib 175 of the outboard brake pad 132 is formed in such a manner so as to allow removal of the outboard brake pad 132 from the window 128 without having to disturb the caliper 112 since the bridge arms are spaced apart by a distance greater than the length of the brake pads. Similarly, the inboard brake pad 130 can be removed via the window 128 without having to disturb the caliper 112. Thus, the invention provides for a brake assembly 110 which allows for removal and replacement of brake pads without removing or otherwise disturbing the sliding caliper 112 and which allows design freedom of the part of the caliper 112 proximate circumferential ends of the outboard brake pad 132.

Thus, in one embodiment of the invention, there is provided a brake assembly with two identical brake pads in which the braking torque loads of the outboard pad are transferred to the caliper via one feature (the radially orientated rib), and the braking torque loads of the inboard pad are transferred to the brake assembly (the carrier) via a different feature (the circumferential ends of the brake pad). Transferring braking torque loads from the outboard and inboard pads in a different manner provides greater design freedom.

FIGS. 6 to 12 show various embodiments of brake pad backplates for use with the present invention. FIG. 6 has been described above in detail. The main body of the pad has a thickness t (which typically would be 6 to 9 millimeters) whereas the thickness T of the pad in the region of the rib 175 is typically be 10 to 18 millimeters. The rib 175 can be integrally cast with the rest of the backplate, or alternatively it can be formed as a separate component and secured (preferably by welding or bolting) to the main body of the backplate.

Figure 10:
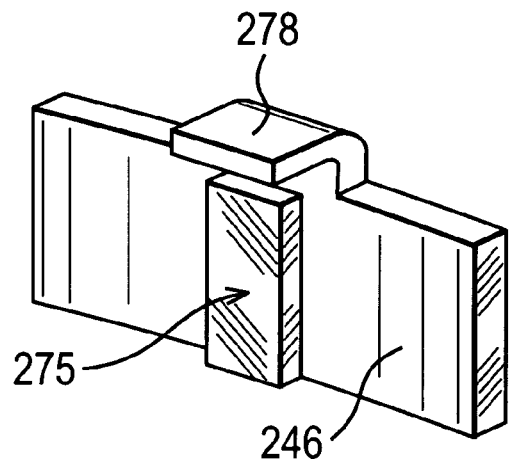
Figure 11:
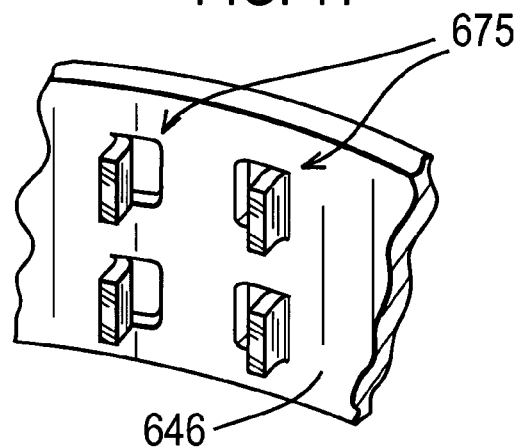

The rib 275 of the backplate 246 of FIG. 10 is similar in this respect. The backplate 246 includes a single centrally disposed tab 278 that fulfils the function of the tabs 178 and 179 of the backplate 146. In a further embodiment, the tab 278 may include a hole through which a bolt 152 passes, thereby securing both the end of the pad retainer and the outboard pad to the caliper 212, with the tab 278 being sandwiched between the caliper 212 and the end of the pad retainer 150.

Figure 7:
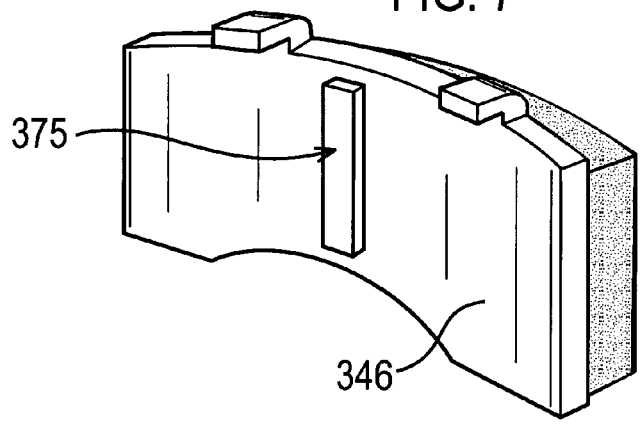
FIGS. 7 to 12 show various alternative embodiments of a brake backplate for use with the present invention.
Figure 8:
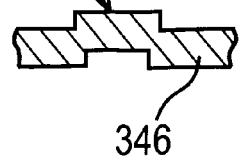
Figure 9:
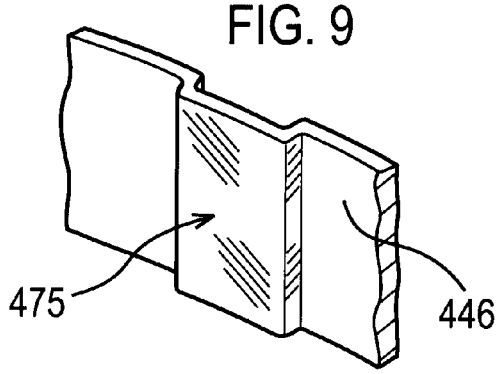
Figure 12:
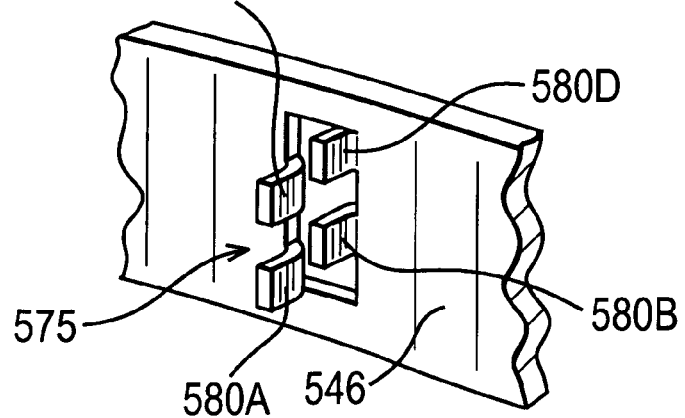

The backplate 346 of FIGS. 7 and 8 has a semi-sheared rib 375 formed by a pressing operation. The rib 475 of a backplate 446 of FIG. 9 is also formed by a pressing operation. The rib 575 of a backplate 546 of FIG. 12 is formed as a plurality of tabs 580A, 580B, 580C and 580D bent from the main body of the backplate 546. Each tab 580A, 580B, 580C and 580D is positioned at a different radius relative to the axis of rotation of the brake disc. The rib 675 of the backplate 646 of FIG. 11 is again formed by a plurality of tabs bent from the main body of the backplate 646. However, in this case the tabs are provided in pairs, with each pair being positioned at substantially the same radius relative to rotational axis of the disc.

FIGS. 17 to 20 show a variant of a tab 178A similar to the tab 178, but with a recess 190 provided by a semi shearing process. A brake pad spring 191 includes a tang 192 which fits into the recess 190, thereby correctly positioning the brake pad spring 191 relative to the brake pad. As shown in FIG. 17 to 20, a projection on the brake pad spring 191 engages a recess in the brake pad. In an alternative embodiment, a projection on the brake pad may engage a recess on the brake spring to fulfil the same function.

Figure 13:
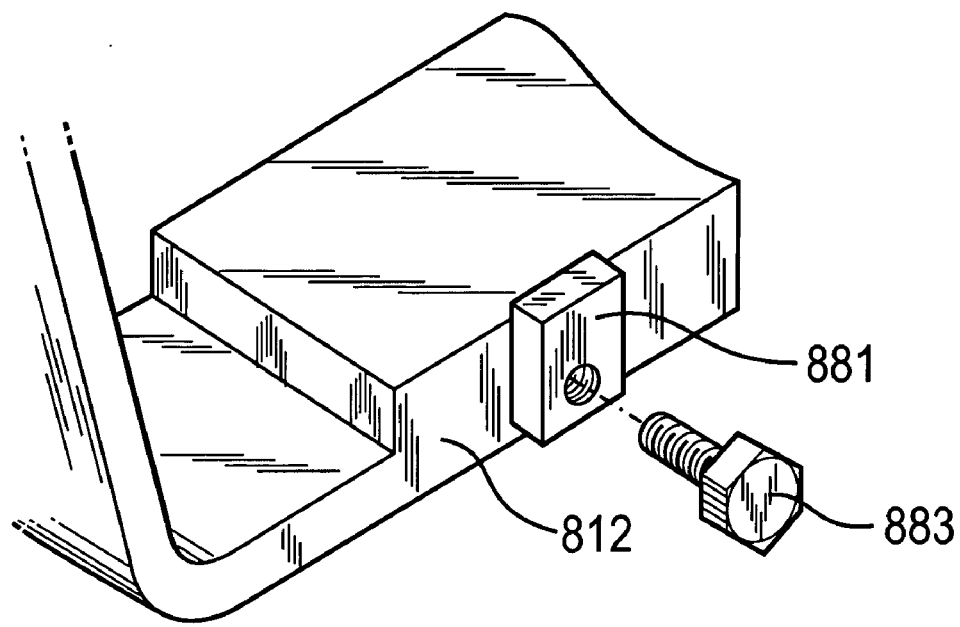
FIGS. 13 to 16 show isometric views of alternative calipers for use with the brake assembly of the present invention.
Figure 14:
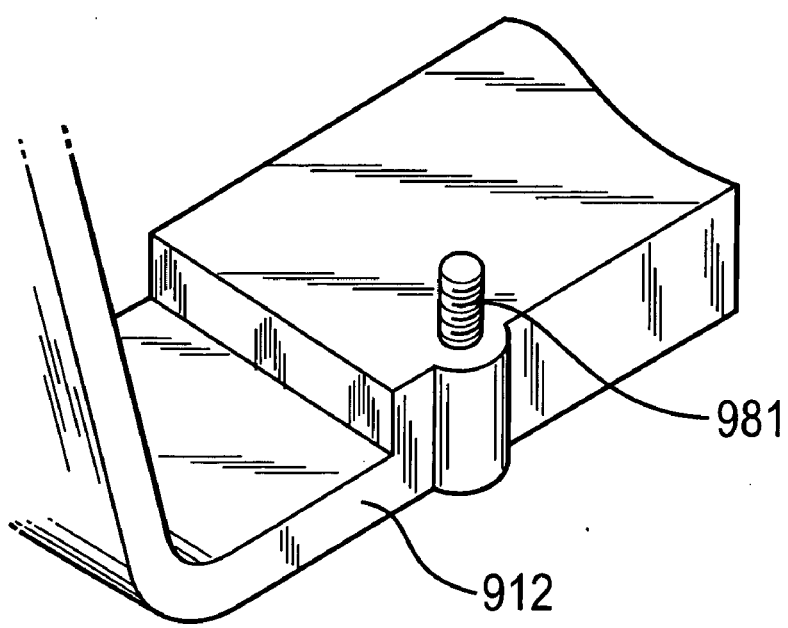
Figure 15:
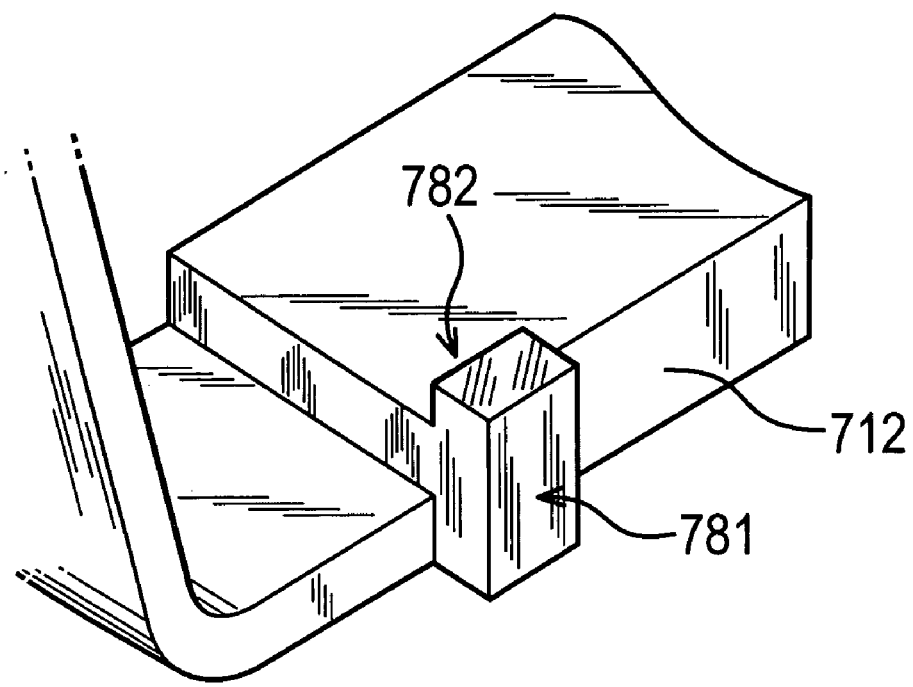
Figure 16:
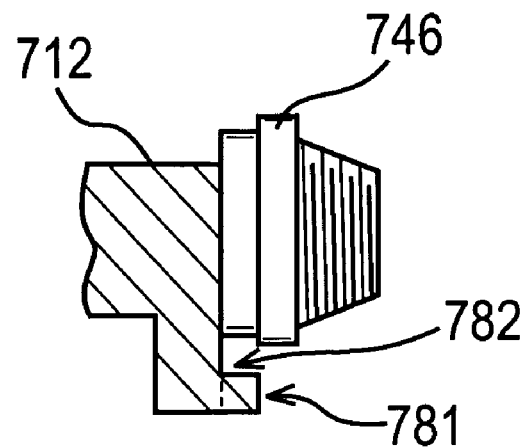
Figure 17:
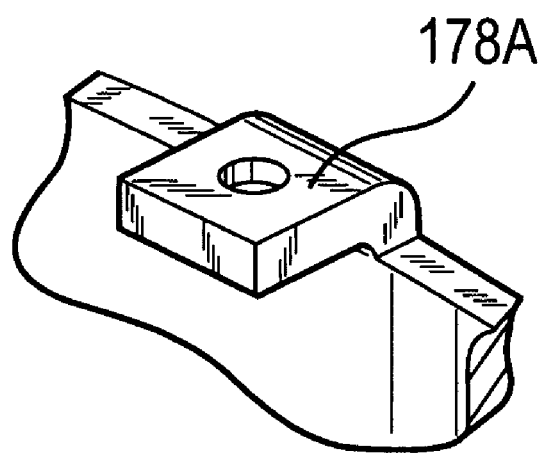
FIGS. 17 to 20 show the manner in which a brake pad spring interacts with certain components of a brake assembly according to the present invention.
Figure 18:
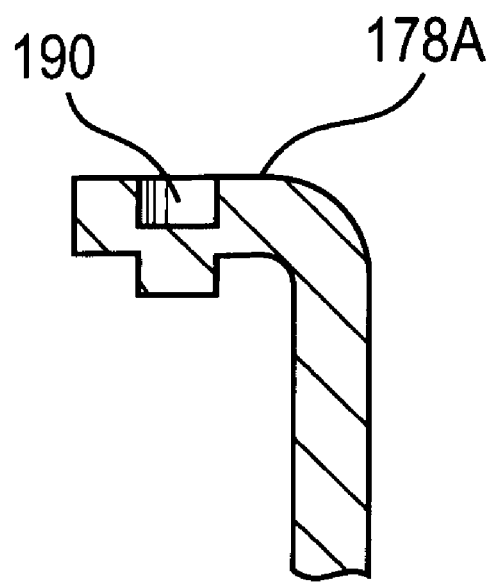
Figure 19:
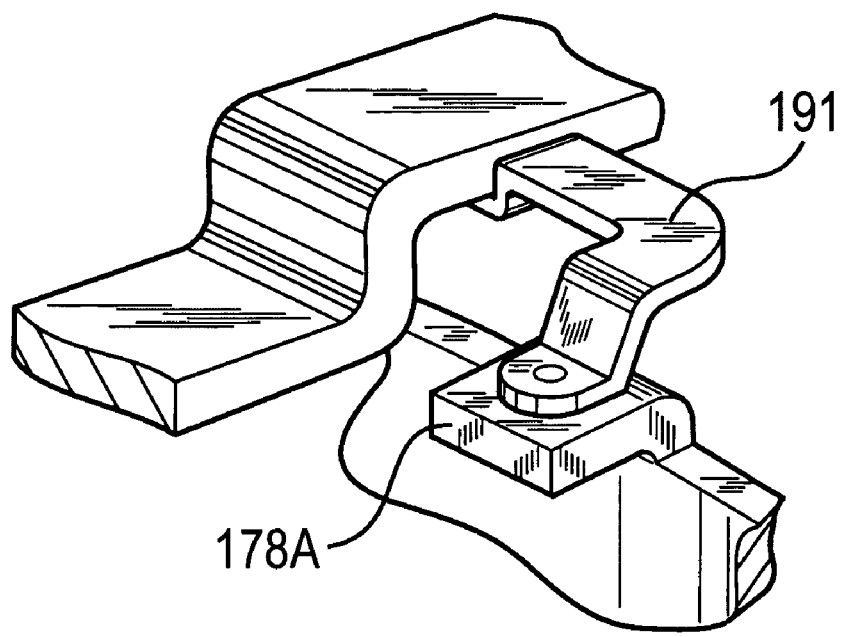
Figure 20:
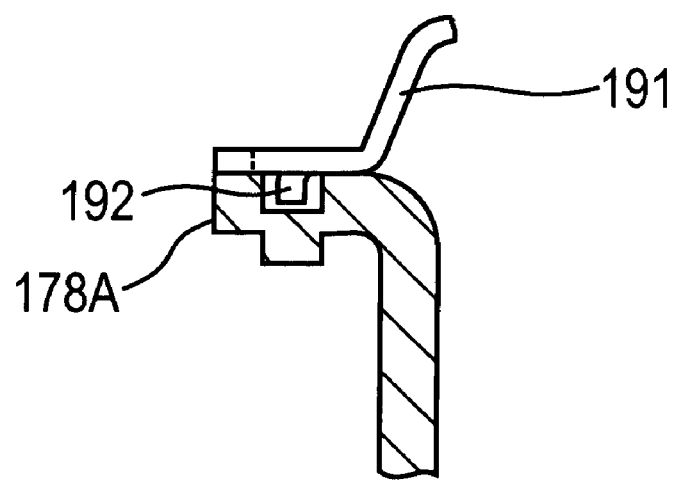

FIGS. 15 and 16 show an alternative embodiment of a sliding caliper 712 according to the present invention which is identical to the sliding caliper 112, except that the radial load abutment pads 156 and 158 of the caliper 112 have been deleted and replaced with a pair of lugs 781 (only one of which is shown) having a radially outwardly facing surface 782 which acts as a radial load abutment. Consequently, an outboard pad backplate 746 does not require bent tabs the equivalent of the tabs 178, 179 or 278. The lug 781 is integrally cast with the sliding caliper body. Alternatively, a separate abutment 881 can be provided (see FIG. 13) which is bolted onto a sliding caliper 812 via a bolt 883. Alternatively, a pin 981 can be fixed in a hole in sliding caliper 912 (see FIG. 14).

As mentioned above, prior art actuator side and reaction side brake pads 30 and 32 are identical. Similarly, the brake pads 130 and 132 are identical. By providing a design of brake assembly having identical inboard and outboard brake pads, the part count number and the likelihood of the pads being wrongly fitted to the brake assembly is reduced. Identical brake pads are inherently interchangeable. While less preferred, it is possible to have non-identical brake pads which are nevertheless still interchangeable.

The term "interchangeable" when applied to two brake pads for fitment to a brake assembly according to the present invention shall be taken to mean that the first of the two interchangeable brake pads can be fitted on an inboard side or an outboard side, and the second of the two interchangeable brake pads can be fitted on the other of the inboard side and outboard side. Operation of the actuator will cause the brake to be applied on whichever side each of the two interchangeable brake pads are fitted.

Thus, certain designs of brake assembly have brake pads which, while not identical, nevertheless differ only in minor aspects unrelated to the present invention. Thus, some brake pads have electrical wear indicators implanted in the inboard brake pad friction material, with such wear indicators being absent on the outboard pad. Alternative designs may have a pre-drilled hole in the friction material of an inboard brake pad to receive a wear indicator, with such a hole being absent on the outboard brake pad. Alternatively, the inboard brake pad may have lugs or recesses associated with fixing of a wear indicator or electrical leads leading to such a wear indicator, with similar features being absent on an outboard brake pad. Two brake pads may have a differing thickness of friction material or may have a differing thickness of brake pad backplate. Such pads, while not being identical, can nevertheless still be interchangeable for the purpose of the present invention.

On certain prior art designs, the clamp load is applied to the inboard brake pad by one or more pistons which apply a localized clamp force to the back of the inboard brake pad.

The clamp load applied to the back of the outboard brake pad is generally far less localized. For this reason, it is known to provide load spreading features on an inboard brake pad without such features being required on the outboard brake pad. In particular, the inboard brake pad might be provided with a thicker backplate when compared with the outboard brake pad. Alternatively, a separate load spreader plate may be inserted between the actuator pistons and the actuator brake pad without such a spreader plate being required on the reaction side of the caliper. Where such a spreader plate is used in conjunction with the present invention, the spreader plate may include a recess to receive a projection of the backplate of the inboard brake pad.

FIGS. 22 to 26 show a further embodiment of a brake assembly 310' with components equivalent to those of brake assembly 110 labelled 200' greater. In this case, the radially load abutment pads 356' and 358' are provided radially inboard of a lower edge 393' of the brake pad backplate. As mentioned above, EP0752541 provides a system wherein the brake pads cannot be inadvertently fitted the wrong way. The present invention also provides a way of ensuring that the brake pads cannot be fitted the wrong way round as follows.

Figure 27:
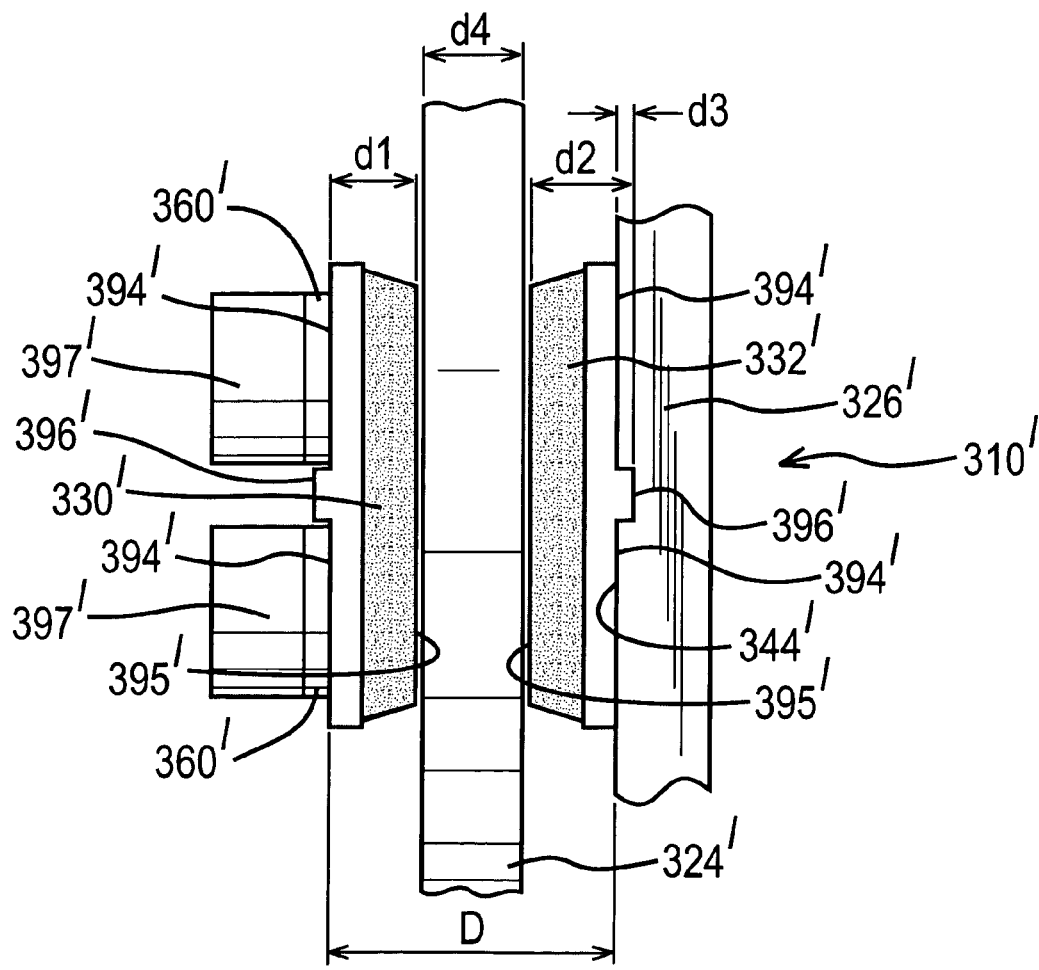
FIG. 27 shows a schematic plan view of certain components of the brake assembly of FIG. 22.

FIG. 27 shows a schematic plan view (taken in the same direction as FIG. 24) of the brake assembly 310'. The pistons 360' are shown in their fully retracted position, i.e., the distance D between the piston and the clamp load abutment 344' has been maximized by rewinding or deadjusting the adjuster mechanism 397' associated with the pistons 360' for adjusting the normal running position of the brake pads as they wear. Brake pads 330' and 332' are new brake pads, i.e., unworn brake pads. Each brake pad has a thrust face 394' which is engaged by the head (clamp load abutments) of the pistons 360' in respect of the inboard brake pad 330' and is engaged by the clamp load abutments 344' in respect of the outboard brake pad 332'. Each brake pad also has a friction surface 395' of the friction material. Each brake pad has a distance d1 between the thrust face 394' and the friction surface 395'. Each brake pad also has a maximum thickness d2 defined between the friction surface 395' and the opposite facing surface of the radially orientated rib 375'. The thickness d3 of the rib 375' is therefore equivalent to the distance d2 minus the distance d1. The thickness of the disc 324' is d4.

The design of the brake assembly 310' is such that D is less than d1 plus d2 plus d4, and therefore it is not possible to fully assemble the caliper with one or both of the brake pads fitted the wrong way, i.e. fitted with the backplate facing the disc. This is because the space required to fit one of the brake pads the wrong way is d1 plus d2 plus d4. Thus, by providing a projecting rib 375' on the backplate, then the thickness d3 of the rib in effect adds to the effective thickness of the brake pad if the pad is fitted the wrong way. With the pad fitted the correct way, the rib thickness is accommodated in the radially orientated groove 354' or between pistons 360'. With the pad fitted the wrong way, the rib abuts the flat surface of the disc.

Figure 28:
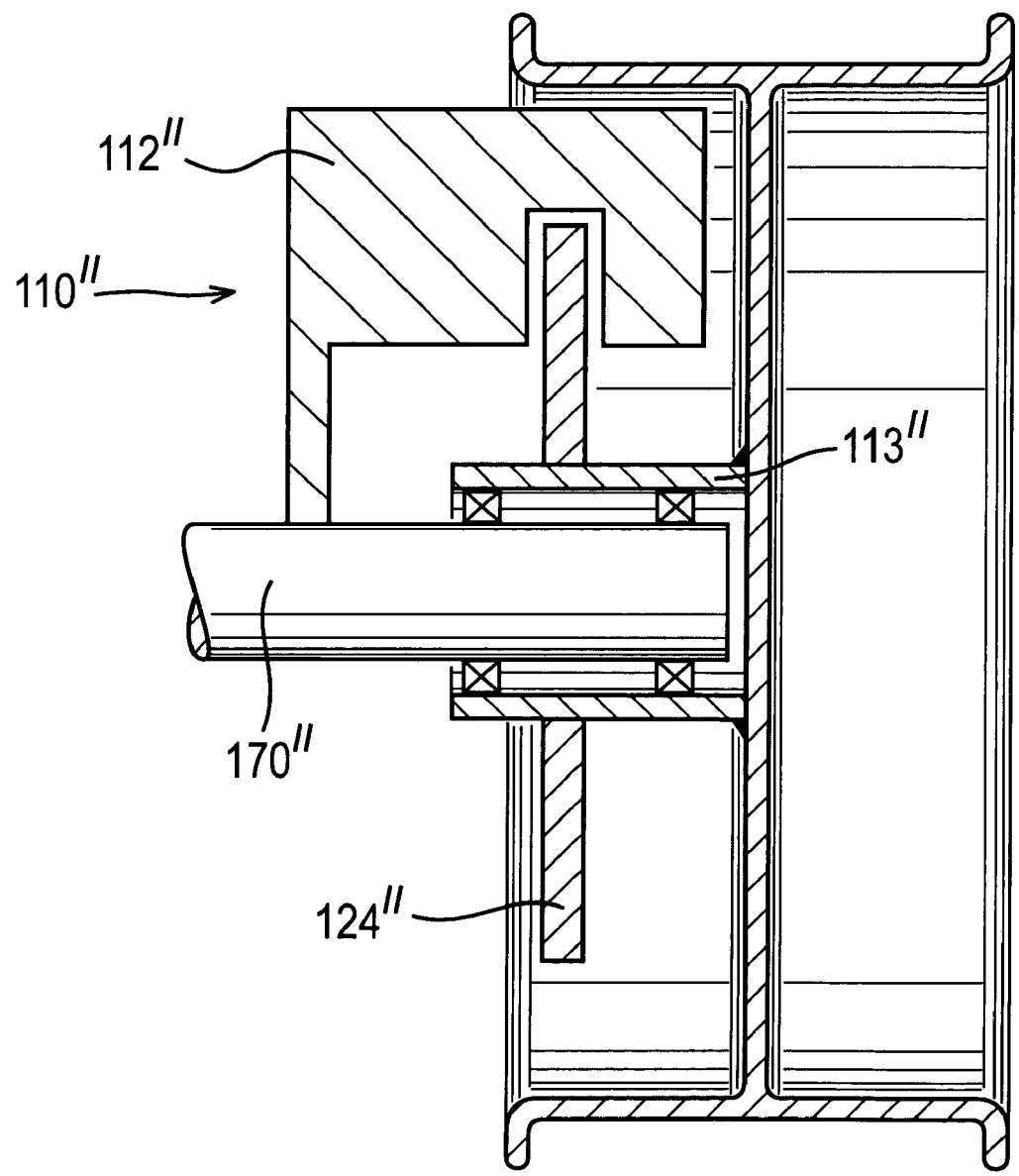
FIG. 28 shows a schematic view of a further embodiment of a brake assembly according to the present invention.

The invention has been described above in relation to a sliding caliper brake. The invention is equally applicable to a fixed caliper brake having a sliding disc. Such an arrangement is shown in FIG. 28 wherein the caliper 112" is similar to the caliper 112, but in this case the only difference is that the caliper 112" is fixed to the axle 170" so that it cannot move in an axial direction. In this case, the brake disc 124" is slideably mounted on splines of the hub 113". In this case, actuation of the actuator causes the inboard brake pad (not shown) to move towards the brake disc 124" and then the brake disc slides along its splines (not shown) and moves towards the outboard brake pad (not shown).

Brake assemblies 110, 310' and 110" are all brake assemblies which are actuated from a single side. The actuator associated with these brake assemblies is on an inboard side of the brake disc in all cases.

Operation of the actuator pistons 160 is well known. For a full description of one particular embodiment of an actuator piston, please see U.S. Pat. No. 6,435,319. When the actuator is operated, the actuator pistons 160 apply an axial load at two circumferentially discreet locations to the associated brake pad backplate, providing a space to accommodate the radially orientated rib 175. The present invention is equally applicable to any actuator mechanism that applies an axial force via abutments at two circumferentially spaced locations, thereby providing a space within which a radially orientated rib or other projection can sit.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A brake assembly comprising:
    a caliper including a first side portion and a second side portion, wherein the first side portion includes a caliper formation, and the first side portion is connected to the second side portion by two spaced bridge arms; and
    a first brake pad and a second brake pad that are interchangeable, wherein each of the first brake pad and the second brake pad includes a first end, a second end, and a pad formation remote from the first end and the second end,
    a brake disc positioned between the first side portion and second side portion, the brake disc defining an axis of rotation,
    wherein the first brake pad is fitted in the first side portion of the caliper and the pad formation of the first brake pad engages the caliper formation of the first side portion of the caliper to transfer all braking torque loads from the first brake pad to the first side portion of the caliper, and
    wherein the second brake pad is fitted in the second side portion of the caliper and the first end and the second end of the second brake pad engage a first abutment and a second abutment, respectively, of the brake assembly to transfer the braking torque loads from the second brake pad to the brake assembly, the pad formation being generally radially orientated with respect to the axis of rotation,
    wherein the two spaced bridge arms of the caliper are spaced apart by an arm distance, the first end and the second end of the first brake pad are spaced by a first end distance, and the first end and the second end of the second brake pad are spaced by a second end distance, and
    wherein the arm distance is greater than the first end distance and the second end distance, allowing the first brake pad to be inserted radially inwardly into and removed radially outwardly from a first space defined between the brake disc, the first side portion and the two spaced bridge arms, and allowing the second brake pad to be inserted radially inwardly into and removed radially outwardly from a second space defined between the brake disc, the second side portion, and the two spaced bridge arms.

2. The brake assembly as defined in claim 1 wherein the pad formation of the first brake pad is provided substantially half way between the first end and the second end of the first brake pad.

3. The brake assembly as defined in claim 1 wherein the pad formation of the first brake pad is a projection.

4. The brake assembly as defined in claim 3 wherein the pad formation of the first brake pad is a rib.

5. The brake assembly as defined in claim 4 wherein the first brake pad includes a backplate and the rib is cast with the backplate.

6. The brake assembly as defined in claim 4 wherein the first brake pad includes a backplate, and the rib and the backplate are separate components that are fixed by one of welding and bolting.

7. The brake assembly as defined in claim 4 the first brake pad includes a backplate, and the rib is formed by semi shearing the backplate.

8. The brake assembly as defined in claim 1 further including an actuator mounted in the second side portion of the caliper, wherein the brake assembly is actuated from a single side by the actuator and the actuator applies a force to the second brake pad in an axial direction to move the second brake pad towards the first brake pad.

9. The brake assembly as defined in claim 8 wherein the actuator applies the force to the second brake pad via a first actuator abutment and a second actuator abutment, and the pad formation of the second brake pad is positioned between the first actuator abutment and the second actuator abutment.

10. The brake assembly as defined in claim 8 wherein the force applied by the actuator causes a reaction force to move the caliper axially and to move the first brake pad towards the second brake pad.

11. The brake assembly as defined in claim 8 wherein the brake disc is positioned between the first brake pad and the second brake pad, and the force applied by the actuator causes the second brake pad to move the brake disc towards the first brake pad.

12. The brake assembly as defined in claim 1 wherein the caliper is slideably mounted on a carrier that is adapted to be fixed to a suspension component of an associated vehicle.

13. The brake assembly as defined in claim 12 wherein the carrier includes the first abutment and the second abutment.

14. The brake assembly as defined in claim 1 wherein the caliper is mounted to a suspension component of an associated vehicle in an axially fixed manner.

15. The brake assembly as defined in claim 1,
wherein the first brake pad includes a first brake pad backplate having a side and an opposing side, and a first friction material is attached to the side of the first brake pad backplate and the pad formation is attached to the opposing side of the first brake pad backplate, wherein the first friction material faces the brake disc, wherein the second brake pad includes a second brake pad backplate having a side and an opposing side, and a second friction material is attached to the side of the second brake pad backplate and the pad formation is attached to the opposing side of the second brake pad backplate, wherein the second friction material faces the brake disc, and wherein, when one of the first brake pad and the second brake pad is assembled into the caliper, the other of the first brake pad and the second brake pad cannot be misassembled into the caliper such that one of the first friction material and the second friction material faces away from the brake disc.

16. The brake assembly as defined in claim 15 wherein the opposing sides of the first brake pad backplate and the second brake pad backplate each include a thrust face, and the first friction material and the second friction material each include a friction surface, wherein a pad thickness is defined between the thrust face and the friction surface of each of the first brake pad and the second brake pad, the pad formation is a projection having a projection thickness, and the brake disc has a disc thickness, wherein the brake assembly includes an adjuster mechanism that is adjustable to adjust a running position of the first brake pad and the second brake pad as the first friction material and the second friction material, respectively, wears, wherein the adjuster mechanism has a first clamp load abutment for engaging the thrust face of the second brake pad, and the first side portion of the caliper has a second clamp load abutment for engaging the thrust face of the first brake pad, wherein a distance is defined between the first clamp load abutment of the adjuster mechanism and the second clamp load abutment of the first side portion of the caliper, and the distance is adjustable between a maximum distance and a minimum distance, wherein the pad thickness of the first brake pad plus the pad thickness of the second brake pad plus the projection thickness plus the disc thickness is greater than the maximum distance.

17. The brake assembly as defined in claim 1 wherein the braking torque loads are transferred from the caliper to at least one pin, wherein the caliper slides on the at least one pin.

* * * * *

UNITED STATES PATENT AND TRADEMARK OFFICE
CERTIFICATE OF CORRECTION

PATENT NO.      : 7,631,733 B2                                        Page 1 of 1
APPLICATION NO. : 11/159831
DATED           : December 15, 2009
INVENTOR(S)     : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 173 days.

Signed and Sealed this

Twenty-first Day of December, 2010

David J. Kappos
*Director of the United States Patent and Trademark Office*